United States Patent
Jacobs et al.

[11] 3,867,224
[45] Feb. 18, 1975

[54] METHOD OF MANUFACTURING SCRAPPER BELTS

[75] Inventors: Fred L. Jacobs, Wapakoneta; Leroy Nagel, St. Marys, both of Ohio

[73] Assignee: The Goodyear Tire & Rubber Company, Akron, Ohio

[22] Filed: Dec. 26, 1973

[21] Appl. No.: 427,885

[52] U.S. Cl. ............... 156/182, 156/184, 156/193, 156/223, 156/245, 156/264, 156/309, 264/248, 264/258
[51] Int. Cl. .................... B32b 31/02, B32b 31/20
[58] Field of Search ........... 156/140, 182, 184, 193, 156/223, 245, 264, 309; 264/157, 248, 258; 15/93

[56] References Cited
UNITED STATES PATENTS

| | | | |
|---|---|---|---|
| 2,290,935 | 7/1942 | Bacon | 264/258 |
| 2,604,656 | 7/1952 | Anderson et al. | 15/93 |
| 3,458,373 | 7/1969 | Knipp et al. | 156/245 |
| 3,574,022 | 4/1971 | Lampert | 156/309 |
| 3,673,030 | 6/1972 | Naulte et al. | 156/193 |
| 3,751,316 | 8/1973 | Menough et al. | 156/193 |

*Primary Examiner*—Daniel J. Fritsch
*Attorney, Agent, or Firm*—F. W. Brunner; L. A. Germain

[57] ABSTRACT

Alternate reinforcing and flexible fabric plies are assembled in a series layup and scrapper belt sizes are cut from the fabric layup. A layer of uncured rubber stock having a square area greater than that of the fabric is placed on one side of the fabric and a cold preform operation shapes the rubber around all sides of the fabric layup. The preform operation results in a one-half section of a scrapper belt and two such halves are placed in a mold separated by a partial length of rubber stock whereupon curing under heat and pressures results in an integrally formed scrapper belt.

8 Claims, 2 Drawing Figures

STEP 5

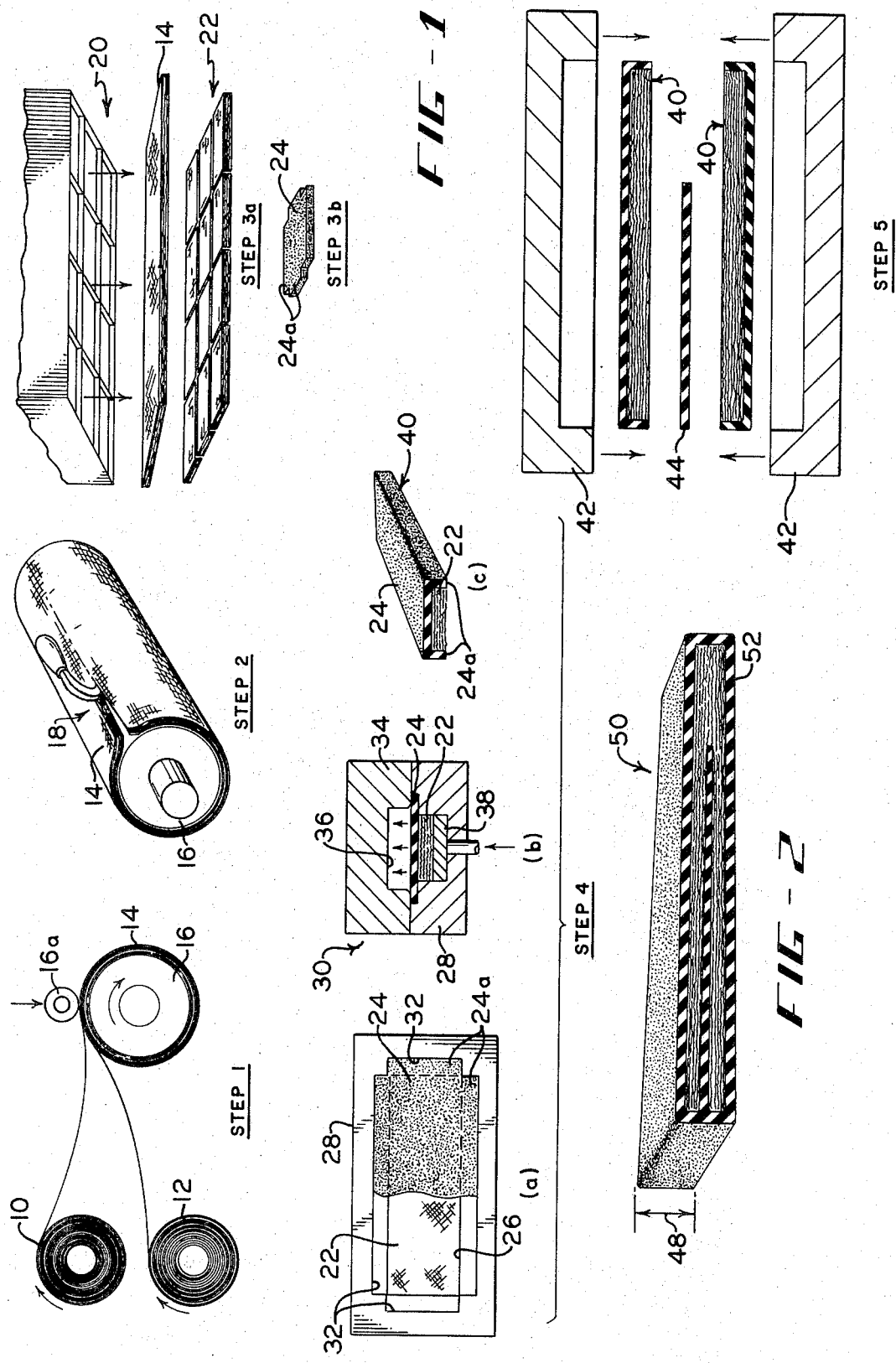

METHOD OF MANUFACTURING SCRAPPER BELTS

BACKGROUND OF THE INVENTION

Dehairing machines find utility in packing house operations wherein animals, such as hogs and the like, are prepared by removing the hair from the carcass. These dehairing machines employ a plurality of rotating scrapper paddles that bear against the animal carcass resulting in removal of the hair. The scrapper paddles are made of a tough rubber belt having scrapper blades attached at one end while the other end is fixedly attached to the machine rotating member.

SUMMARY OF THE INVENTION

This invention generally relates to scrapper paddles as exemplified in U.S. Pat. No. 2,604,656 and utilized in dehairing machines and more specifically to a method of manufacturing scrapper paddle belts.

It is a principal object of the invention to provide a method of manufacturing scrapper belts that eliminates some of the hand operations of the present manufacturing method and further provides a substantially automated production line.

Another object is to increase production and decrease costs of manufacturing scrapper belts by providing a fast and efficient method of manufacture.

These objects and other objects and advantages of the invention which will become more evident from the detailed description that follows are provided in a method of manufacturing scrapper belts comprising the steps of (1) assembling a layup of fabric plies on a mandrel; (2) cutting the fabric off of the mandrel to provide a flat sheet of multi-layed fabric material; (3) cutting belt sized units from the fabric; (4) applying uncured rubber stock to one side of the fabric layup having a square area slightly greater than the fabric and cold forming the rubber stock around all edges of the fabric to form one half belt unit; and (5) inserting two half belt units in a mold in fabric faced opposed relation separated by a partial belt length piece of rubber stock and curing the two half belt units and separation rubber into a single integral unit by the application of heat and pressure.

DESCRIPTION OF THE DRAWING

The features and advantages of the invention are better understood from a consideration of the description taken in conjunction with the accompanying drawing, in the several figures of which like reference numerals identify like elements, and in which:

FIG. 1 illustrates the method steps in accomplishing the objects of the invention; and FIG. 2 is a cutaway perspective view of a scrapper belt as made by the method of FIG. 1.

DETAILED DESCRIPTION OF THE INVENTION

With reference to the drawing, steps 1, 2, and 3 show the production of the fabric interlayers for the scrapper belt. In step 1, a roll of reinforcing fabric material 10 and a roll of flexible fabric material 12 are provided. The reinforcing fabric 10 is preferably an adhesive coated square woven nylon while the flexible fabric 12 is preferably an adhesive coated square woven cotton. These fabrics are intimately layered as alternate plies 14 on a roller mandrel 16 by rotation of the mandrel with pressure being applied to the layup by a pressure roller 16a.

For the scrapper belts, eight alternate plies of nylon/cotton fabric provide the requirements for one of two interlayers, which is met by four rotations of the mandrel 16. When the desired thickness of fabric material on the mandrel is met, the rolls 10 and 12 are severed at the mandrel and the composite plies of nylon and cotton fabric are removed from the mandrel 16 by cutting along the mandrel axis as shown in step 2 at 18. The composite fabric sheet 14 is next laid out flat in a die cutter 20 as illustrated in step 3 with individual units 22 being produced in quantities determined by the size of sheet 14 and the required size of the units 22. Step 3 is referenced as 3a and 3b because both fabric and rubber stock may be cut in similar and parallel operations, the rubber being of a square area size greater than the fabric by reason of side extensions 24a. The extensions 24a have a depth substantially equal to the thickness of the fabric composite 14 and are for the purpose of covering the sides of the fabric as illustrated in step 4. Whereas step 3a involves cutting fabric units 22, step 3b involves cutting rubber stock units 24 and these two units are brought together in the preform operation of step 4.

Step 4 illustrates a cold preform operation that results in half belt sections 40 shown at (c). In this operation, a fabric unit 22 is placed in a sized recess 26 in the bottom half 28 of a preform generally indicated at 30. In an upper recess 32 is placed a rubber stock unit 24, the recess providing for placement of the extensions 24a. An upper half section 34 of the preform 30 is positioned with respect to the lower half 28, the upper half characterized by a recess 36 having a square area size substantially equal to that of a completed belt. The cold forming operation is accomplished by actuating a piston 38 in the bottom half section 28 that drives the rubber/fabric layers into the upper recess 36. Because the piston 38 is of the same square area as the fabric unit 22, the rubber extensions 24a are cold formed around the edges of the fabric resulting in the half belt unit 40 that is ready for curing into a completed scrapper belt 50 when combined with another unit 40 as illustrated in step 5 and FIG. 2.

In step 5, two preformed half belt units 40 are placed in fabric-faced-opposed position in a mold 42 and are separated by a partial length of rubber stock 44. Upon closure of the mold 42 and the application of heat and pressure, curing of the rubber is accomplished and an integrally formed fabric encapsulated rubber scrapper belt 50 is produced. The interlayer of rubber stock 44 increases the butt end thickness 48 of the belt 50, which end is fixedly attached to the rotating member of the dehairing machine, while the thinner end 52 carries the scrapper knives. The interlayer 44, because of its position between the two fabric layers 22 and its extended length, provides a chafing buffer between the two fabric layers in the area of the belt that flexes the most. The chafing that would exist except for this rubber interlayer produces detrimental heat that results in decreased belt life.

The advantages of this method of manufacture are apparent and include the following: (1) half belt units 40 may be continuously produced; (2) each step or operation is independent of the preceding or following one; (3) the fabric material is layered under pressure resulting in closer knit elements and is totally encapsulated by rubber; and (4) the molding operation is greatly simplified and results in an improved product having less chance of failure due to the generation of air pockets or bubbles. The orientation of half belt sections and the rubber interlayer is such that trapped air escapes along the lateral edges of the belt during molding which air may not otherwise escape if separate edge pieces of rubber are required to encapsulate the fabric in the mold.

It should be understood that the drawing and description are simplified for the purpose of this description and may be further automated to increase production. For example, it is contemplated that the preform operation includes multiple preforms 30 that produce a plurality of half belt sections 40 in a single operation and the mold 42 will also provide for curing of a plurality of belts 50 in a single operation.

Therefore, while certain representative embodiments and details have been shown for the purpose of illustrating the invention, it will be apparent to those skilled in the art that various changes and modifications may be made therein without departing from the spirit or scope of the invention.

What is claimed is:

1. The method of manufacturing belts for scrapper paddles used in dehairing apparatus comprising the steps of:
    A. assembling a layup of alternate reinforcing and flexible fabric plies;
    B. cutting belt sized units from the fabric layup;
    C. providing uncured rubber stock having a square area greater than that of the fabric layup;
    D. applying the rubber to one side of the fabric and cold forming the rubber around all edges of the fabric to form one-half of a belt unit;
    E. inserting two half belt units into a mold in fabric-faced-opposed relation separated by an interlayer of rubber stock; and
    F. applying heat and pressure to form an integrally molded belt unit.

2. The method as set forth in claim 1, wherein the alternate plies comprise adhesive coated square woven nylon and cotton fabrics.

3. The method as set forth in claim 1, wherein the fabric layup is assembled under pressure on a roller mandrel to a desired number of plies and removed from the mandrel by cutting along the mandrel axis such that a single sheet of multilayered fabric is provided.

4. The method as set forth in claim 1, wherein cutting of fabric is accomplished in a die cutter.

5. The method as set forth in claim 1, wherein the greater square area of the rubber is provided by edge extensions having a depth substantially equal to the thickness of the fabric layup.

6. The method as set forth in claim 1, wherein the interlayer of rubber stock has a length less than the total length of a half belt unit.

7. The method of manufacturing belts for scrapper paddles used in animal carcass dehairing apparatus comprising the steps of:
    A. assembling alternate plies of reinforcing nylon and flexible cotton fabric material on a mandrel to form a composite series layup;
    B. removing the composite fabric layup from the mandrel by cutting along the axis of the mandrel;
    C. cutting the fabric into belt sized units in a die cutter;
    d. providing uncured rubber stock having a square area greater than the square area of the fabric by reason of edge extensions having a depth substantially equal to the thickness of the fabric layup;
    E. applying the rubber stock to one side of the fabric and cold forming the edge extensions around all edges of the fabric to form one half of a belt unit;
    F. inserting two half belt units in fabric-faced-opposed relation separated by an interlayer of uncured rubber stock having a length less than the length of the half belt units; and
    G. applying heat and pressure to the mold to cure the rubber and form an integral belt unit.

8. The method as set forth in claim 7, wherein a roller applies pressure to the composite fabric layup on the mandrel to compress the plies.

* * * * *